United States Patent [19]

Lee

[11] Patent Number: 4,816,863

[45] Date of Patent: Mar. 28, 1989

[54] EXPOSURE CONTROL SYSTEM FOR CONTINUOUS TONE ELECTROPHOTOGRAPHIC FILM

[75] Inventor: Denny L. Y. Lee, West Chester, Pa.

[73] Assignee: E. I. Du Pont de Nemours and Company, Wilmington, Del.

[21] Appl. No.: 934,802

[22] Filed: Nov. 25, 1986

[51] Int. Cl.⁴ .............................................. G03G 15/00
[52] U.S. Cl. .................................. 355/14 E; 355/3 R; 358/300; 346/153.1; 346/158; 430/23; 430/24
[58] Field of Search ............. 355/3 R, 14 E; 358/300; 346/153.1, 158, 160; 430/23, 24

[56] References Cited

U.S. PATENT DOCUMENTS

| | | | |
|---|---|---|---|
| 3,251,685 | 5/1966 | Bickmore | 96/1 |
| 3,700,955 | 10/1972 | Lowe | 315/20 |
| 4,134,668 | 1/1979 | Coburn | 355/3 R |
| 4,201,996 | 5/1980 | Stein | 346/158 |
| 4,268,159 | 5/1981 | Tashiro | 355/3 R |
| 4,346,409 | 8/1982 | Ishida et al. | 358/280 |
| 4,350,435 | 9/1982 | Fiske et al. | 355/14 E X |
| 4,355,891 | 10/1982 | Cole et al. | 355/57 |
| 4,359,745 | 11/1982 | Reid | 346/23 |
| 4,367,943 | 1/1983 | Nakamura | 355/3 |
| 4,402,015 | 8/1983 | Yamada | 358/280 |
| 4,446,472 | 5/1984 | Kato et al. | 346/153.1 |
| 4,458,258 | 7/1984 | Amaya et al. | 346/153.1 |
| 4,491,875 | 1/1985 | Kawamura | 358/298 |
| 4,524,116 | 6/1985 | Humberstone | 430/31 |
| 4,551,732 | 11/1985 | Rogers | 346/110 R |
| 4,560,989 | 12/1985 | Radochonski et al. | 346/1.1 |
| 4,571,604 | 2/1986 | Schiebel | 346/161 |
| 4,578,331 | 3/1986 | Ikeda et al. | 430/42 |
| 4,627,712 | 12/1986 | Usami | 355/14 E X |
| 4,657,377 | 4/1987 | Takahashi | 355/14 E X |

Primary Examiner—Patrick R. Salce
Assistant Examiner—Emanuel Todd Voeltz

[57] ABSTRACT

An exposure control system which permits accurate reproduction of optical density levels on a final image is characterized by a dynamically corrected look-up table. The look-up table is used to calculate each desired exposure intensity level for each image pixel on the basis of data obtained during the exposure and development of an immediately preceding image.

4 Claims, 4 Drawing Sheets

EXPOSURE CONTROL SYSTEM FOR CONTINUOUS TONE ELECTROPHOTOGRAPHIC FILM

BACKGROUND OF THE INVENTION

1. FIELD OF THE INVENTION

This invention relates to electrophotography and more particularly to a method for controlling the intensity of exposure of an electrophotographic continuous tone film to accurately reproduce a desired optical density range.

2. DESCRIPTION OF THE PRIOR ART

Electrophotographic image reproduction systems have been in existence for a number of years. In general, such systems operate as follows. An imaging element conprising a photoconductive layer that upon exposure to actinic radiation becomes conductive allowing an accumulated charge on the element surface to selectively bleed through a conductive path is first charged with a uniform charge layer by passing such element under a source of ionizing radiation, e.g., a scorotron or other such corona charging device. The charged surface is then exposed to imagewise modulated actinic radiation, rendering the photoconductor layer conductive and discharging the accumulated charge. The term "actinic radiation" is construed to encompass not only photochemical activity but also the photoelectric effects described herein and the like.

In a continuous tone system, as contemplated herein, the amount of charge left on the imaging element surface is inversely proportional to the amount of actinic radiation received by the element. In this manner a pattern of electrostatic charges is produced on the imaging element forming a latent image corresponding to the imagewise modulated actinic radiation incident on the element. The magnitude of the electrostatic charge at any one point on the imaging element is inversely proportional to the intensity of the exposing actinic radiation.

The latent image may now be rendered visible by development using colored particles which preferably bear a static charge and which are attracted to the charge pattern on the imaging element. Depending on the desired result, the colored particles may bear a charge of the same polarity as the charge originally placed on the imaging element or an opposite polarity. If the charge polarities are the same and an appropriate bias electrode used the colored particles are preferentially attracted to the areas from which the original charge has been bled away, producing a "dark" or "colored" area of intensity proportional to the original exposure. If the charge polarities are opposite, then the areas that received the least exposure to actinic radiation will attract the most particles. In the first instance there is an image reversal; the light tones appear dark and the dark tones appear light. In the second instance the image tones are reproduced the same as the original.

The colored particles may be in dry form or may be supplied in a dispersion in a carrier liquid. Generally referred to as toners, the colored particles or dispersions are well known in the art. Liquid toners tend to produce higher image resolution and are sometimes preferred for that advantage.

Following toning, the image may be viewed as such, dried, fused or transferred onto a receiving element or any combination of the above, as is well known in the art.

In recent years the widespread use of computers and their ability to store and manipulate large amounts of data has resulted in image handling systems that employ image enhancement in applications such as radiography, printing, etc. In radiography, for instance, a radiogram may be split into a number of digitally encoded picture elements, or "pixels", transmitted through telephone lines, stored on a disk, retrieved at will, contrast enhanced, and displayed for diagnostic purposes. Typical display media are cathode ray tubes, silver halide film, electrostatic display, etc.

At present the display of high resolution diagnostic quality images is inadequate. Cathode ray tube displays have limited resolution and dynamic range. Reproduction on a silver halide film, while offering excellent resolution and dynamic range, is expensive, usually time consuming and requires darkroom facilities. Electrophotography is very promising since it reproduces high resolution images of sufficient dynamic range rapidly without the need for dark room development and complicated chemical processes. However, in order to obtain the required diagnostic quality in the finished product the exposure intensity level must be controlled to compensate for the electrostatic charge-retaining characteristic response of an electrophotographic film and for the toner electrostatic response. To complicate matters neither the response of the film nor of the toner is linear, and both tend to vary with time, usage and/or environmental conditions.

Accordingly, in view of the foregoing, it is believed advantageous to provide a system for the accurate reproduction of the tonal range in a continuous tone image.

SUMMARY OF THE INVENTION

In accordance with this invention there is provided an exposure control system which permits the accurate reproduction of desired optical density levels on a final image through the use of a dynamically corrected look-up table. The look-up table is used to calculate each desired exposure intensity level for each image pixel on the basis of data obtained during the exposure and development of an immediately preceding image. This is possible because changes in the characteristic response of both the film and the toner are gradual so that data developed during one exposure can be used successfully to control the following exposure.

It is in accordance with this invention to provide a method for generating a dynamically corrected look-up table for modulating the intensity of actinic radiation incident on an imaging element comprising the steps of:

(a) modulating the intensity of actinic radiation representative of an image having a predetermined number of variable optical density levels in accordance with a dynamically corrected look-up table, (b) exposing an imaging element to the modulated actinic radiation representative of the image, (c) modulating the intensity of the actinic radiation with information representative of a step wedge having a predetermined number of known optical density levels using the dynamically corrected look-up table, (d) exposing the imaging element to the actinic radiation modulated by the step wedge information, (e) developing the image and step wedge on the imaging element, (f) comparing the optical density levels of the developed step wedge to the known optical density levels.

(g) generating a correction signal based on the difference between the developed step wedge optical density and the known optical density levels, and (h) correcting the look-up table in accordance with the correction signal.

BRIEF DESCRIPTION OF THE DRAWINGS:

The invention will be more fully understood from the following detailed description thereof, taken in conjunction with the accompanying drawings, which form a part of this application and in which.

DETAILED DESCRIPTION OF THE INVENTION

Figure 1:
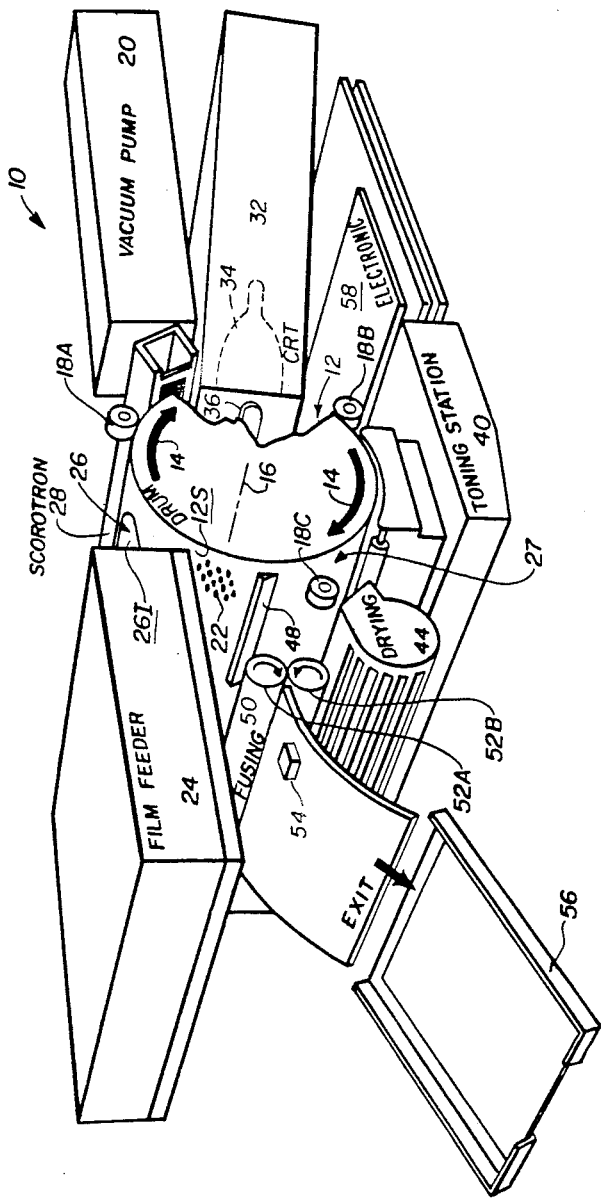
FIG. 1 is a stylized pictorial representation of an apparatus useful in the practice of the present invention.

Throughout the following detailed description similar reference numerals refer to similar elements in all FIGS. of the drawings.

With reference to FIG. 1 shown is a stylized pictorial representation in perspective of an electrophotographic copying apparatus generally indicated by reference character 10 useful to implement the present invention. The apparatus 10 includes a drum 12 mounted for rotation in the direction of the arrow 14 about an axis of rotation 16. The drum has a surface 12S. The drum 12 is also provided with an array of conductive rollers of which three such rollers 18A, 18B and 18C are shown. The rollers 18 are connectible to a predetermined electrical potential, preferably ground. Means for holding a film sheet to the surface 12S of the drum 12 is provided. Suitable for use as the holding means is a vacuum holddown system including a vacuum pump 20 operatively connected in fluid communication with a plurality of holes 22 arranged in the surface 12S of the drum 12. It should be understood that any other suitable holding means may be used, such as, a properly placed clip arrangement.

A sheet film feeder 24 is disposed adjacent to the drum 12. The feeder 24 is adapted to dispense an electrophotographic imaging element 26, hereinafter referred to as the film sheet, onto the surface 12S of the drum 12. The film sheet 26 carries an imaging surface 26I thereon. The film sheet 26 is held in place by the holding means discussed above such that the imaging surface 26I faces outwardly away from the surface 12S of the drum 12 as the drum 12 transports the film sheet 26 along a path of transport 27 through the apparatus 10. The sheet 26 comprises two layers on a supporting base, usually seven mil polyester base. The outer of the two layers containing the imaging surface 26I is a photoconductive layer. The other layer is electrically conductive. A portion of the outer layer is removed along at least one edge thereof to define a strip of conductive layer so as to permit the conductive layer to be grounded through contact with the rollers 18A, 18B or 18C as the film sheet 26 is transported along the path of transport 27.

A scorotron or other corona-type charging device 28 is placed adjacent to the drum 12 downstream in the direction of rotation shown by the arrow 14 from the film feeder 24. The scorotron charging device 28 is operative to apply a uniform electrostatic charge over the entire imaging surface 26I of the film sheet 26.

An exposure station 32 is located adjacent to the drum 12 downstream in the direction of the arrow 14 from the charging device 28. The exposure station, which is a source of radiant energy in the form of modulated actinic radiation, preferably comprises a cathode ray tube (CRT) 34 having a fiber optic faceplate 36. The term "actinic radiation" is construed to encompass not only photochemical activity, but also the photoelectric effects described herein and the like. The faceplate 36 terminates in close proximity to the imaging surface 26I of the film sheet 26. A laser may be substituted as a source of actinic radiation.

Next following the exposure station 32 in the direction of the arrow 14 is a toning station 40. The toning station 40 is implemented in the preferred instance by a conventional liquid toner applicator of the type sold by Imagen Corporation as part number AG3-0054-020 milled to conform to the curvature of the drum 12. A D.C. motor is preferably substituted for the original A.C. drive motor and a passive roller is given an active drive. A drying station 44 typically comprising an air blower is located adjacent to the toning station 40.

A stripping means indicated by reference character 48 is placed in an operative position along the path 27 of the film sheet 26 to strip and to guide an exposed and imaged film sheet 26 from the surface 12S of the drum 12 to a fusing station 50. The stripping means 48 preferably takes the form of a vacuum release mechanism. The fusing station 50 typically comprises a pair of pressure rollers 52A, 52B. Depending upon the particular toner used at least one of the pair of rollers 52 may be heated to assist in the fusing of the toner.

An exposure measurement device 54 comprising a light source and associated photodetector is placed along the path of one edge of the film sheet 26. As is discussed herein the device 54 measures the optical density of a predetermined step wedge or tablet exposed along one edge of the surface 26I of the sheet 26. Wedges and step tablets are known in the art and discussed, e.g., in SPSE Handbook of Photographic Science and Engineering, Thomes Jr., Editor, Willey Interscience, 1973 edition, pages 783 and 784. A film sheet receiving tray 56 is provided to receive an imaged film sheet 26 exiting from the fusing station 50.

An electronic exposure control system 58, discussed in more detail herein, is provided to control the operative elements of the exposure apparatus 10.

Figure 2:
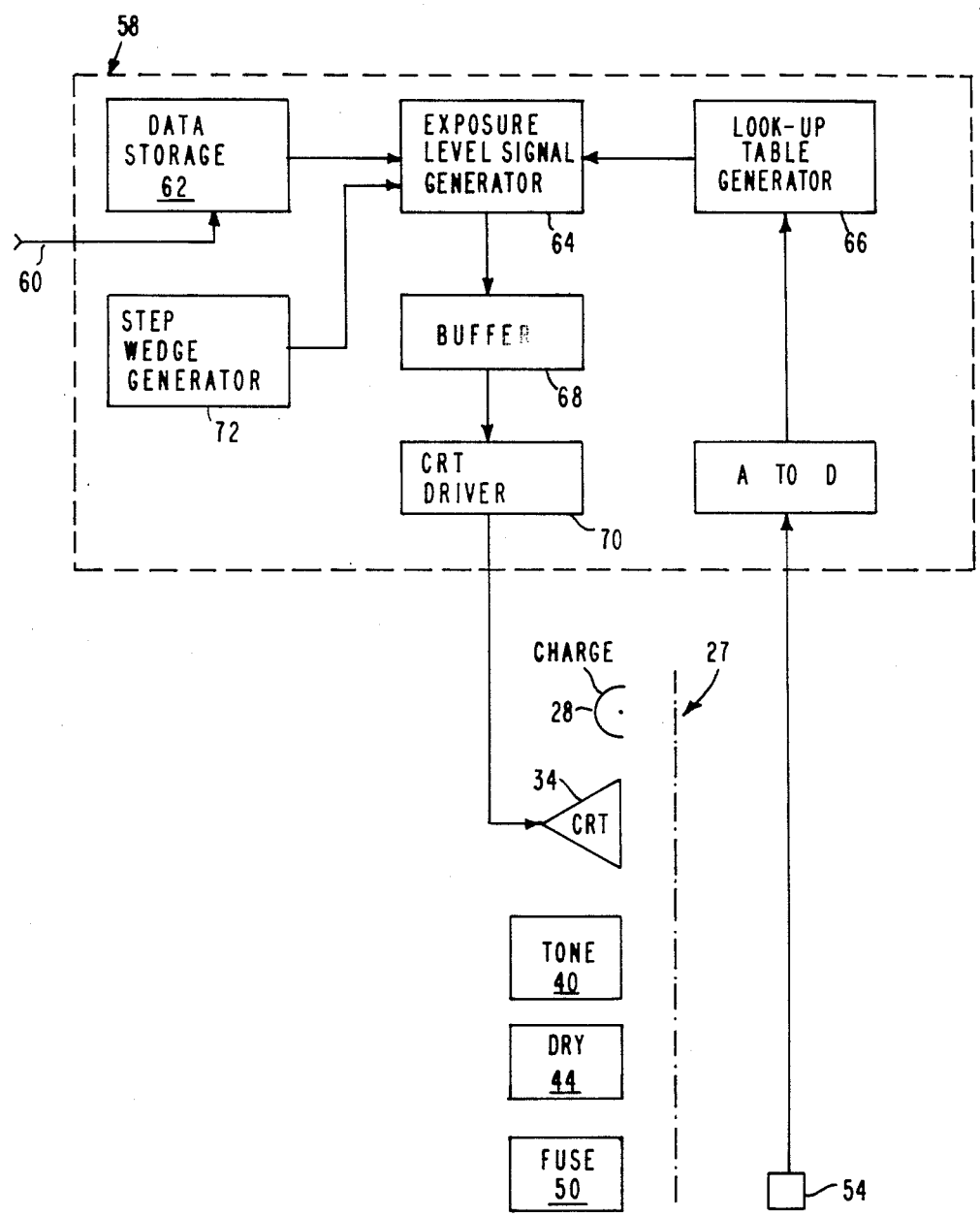
FIG. 2 is a functional block diagram of the apparatus of FIG. 1, useful in practicing the present invention.

The operation of the exposure apparatus 10 may be best understood in connection with FIGS. 1 and 2 in which the latter is a simplified functional block diagram of the main elements of the apparatus used in the generation of an image on the surface 26I of the film sheet 26 in accordance with the present invention.

In operation, upon command through an input line 60 a film sheet 26 is released from the feeder 24 onto the surface 12S of the rotating drum 12. The film sheet 26 is held on to the drum 12 by the action of the vacuum pump 20 through the holes 22. The film sheet 26 is then uniformly charged over its surface 26I by the action of the scorotron 28. The charged film sheet 26 is transported along the path of transport 27 past the exposure station 32 where it is imagewise exposed to actinic radiation of varying intensity. As a result of this imagewise exposure the surface 26I of the film sheet 26 is selectively discharged in proportion to the intensity of the incident radiant energy leaving on the surface 26I of the film sheet 26 a charge pattern of various intensities representative of a latent image.

The latent image is rendered visible by toning. Toning occurs in the toning station 40 where the surface in preferably immersed in a pool of liquid toner. Toner particles are attracted to the charged pattern on the surface 26I in proportion to the charge density on that surface. The surface 26I of the toned film sheet 26 is dried of any residual liquid at the drying station 44, stripped from the drum by the stripping means 48, and the toner image is permanently fixed onto the surface 26I in fusing station 50.

As part of the exposure process a step wedge comprising an image of a predetermined number, usually fifteen, of predetermined intensity (gray) levels ranging in optical density from transparent to opaque is exposed onto the surface 26I of the film sheet 26. The step wedge is preferably disposed along one edge of the film sheet 26 so as to be read by the exposure measurement device 54. Of course, were the step wedge otherwise located on the film sheet 26 the measurement device 54 would be correspondingly located in the apparatus 10.

The electronic exposure control system 58 is used to control the intensity of the actinic radiation incident on the film surface 26I through the CRT 34. The control system 58 comprises a data storage device 62 operative on command to store and to retrieve image data in digital form. The storage device 62 contains a digital representation of the intensity of each of a predetermined number of pixels corresponding to an image to be reproduced. Each intensity level is used to modulate the intensity of the actinic radiation produced from the CRT to create a latent image on the surface 26I of the film sheet 26. The device 62 may also include functional elements enabling it to receive the digital data representative of the image from a remote source. It may also include an input/output interface for operator control.

The data storage device 62 is connected at its output to an exposure level signal generator 64 that modifies the digital representation of the exposure intensity level for each pixel in accordance with a predetermined value stored in a dynamically corrected look-up table produced in a look-up table generator 66. The output of the exposure level signal generator 66 is stored in a temporary buffer element 68 and then applied through a CRT driver 70 to the CRT 34. Preferably the CRT is protected from burnout using circuitry known in the art.

A step wedge generator 72 is also connected to the exposure level signal generator 64, modified in accordance with the look-up table, to produce an output from the CRT 34 to generate the latent image of the step wedge. The generator 66 contains means for generating a set of correction values which are applied to modify a table of exposure correction factors. The exposure correction factors are used to determine the intensity of the imaging beam needed to reproduce in the final toned image the original optical density value of each pixel.

The electronic exposure control system 58 also includes a suitable analog-to-digital converter 74 operatively associated with the measurement device 54 to produce a digital signal representative of the actual optical densities of the toned step wedge image. These digital signals are applied to the look-up table generator 66. The manner in which the predetermined values in the table are derived in the generator 66 is explained in full detail hereafter. The functional elements 62, 64, 66, 68 and 72 are preferably implemented in a computer system using a Motorola 68000 microprocessor as the central processing unit (CPU). A computer program of twenty-six pages, A-1 through A-26, in M68000 assembly and "C" source language whereby the functions 64, 66 and 72 are performed as well as the manner for generating the look-up table and for correcting the exposure intensity level is appended to and forms part of this application. The functions 62 and 68 are memories implemented in the hardware of the computer system.

Figure 3:
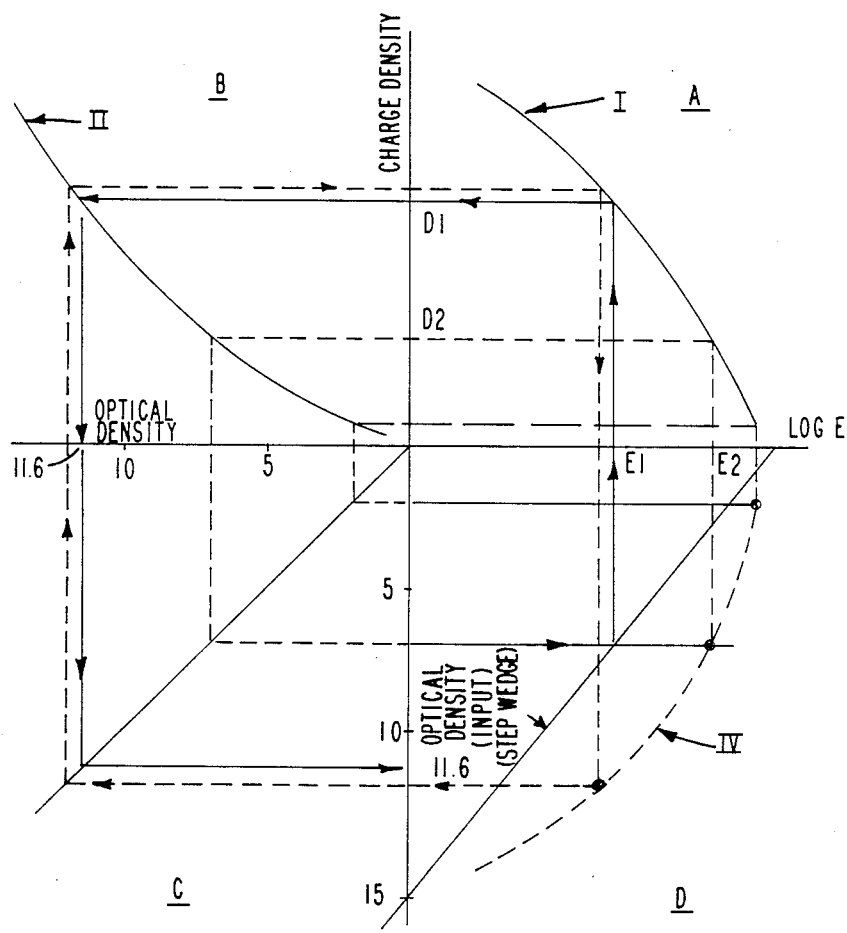
FIG. 3 is a graphic representation of the relationships between imaging element, toner, input and output optical density and exposure intensity for a system in accordance with the present invention.

The basis upon which the look-up table is dynamically corrected in the generator 66 is believed best understood from the following discussion. With reference to FIG. 3 there are shown four curves which are helpful in explaining the generation and dynamic correction of the look-up table according to this invention. The four quadrants A, B, C and D and curves I, II, III and IV represent various relationships between different elements cooperating to reproduce an image. The upper right hand quadrant A shows an imaging element transfer function Curve No. I, as the relationship between the residual charge density on the surface of a precharged imaging element as a function of exposure of the element to actinic radiation. Following standard practice, the logarithm of the exposure (Log E) is used as the abscissa.

The upper left quadrant B contains the transfer function of the toner in the form of optical density as a function of charge density (Curve No. II). The lower left quadrant C is simply a transfer curve T to transfer optical densities between the vertical optical density axis and the horizontal optical density axis. Optical densities are represented here in terms of fifteen equidistant steps spanning the range of optical densities available in this system.

The lower right quadrant D represents the graph of the look-up table. Curve No. III is a linear function extending from a minimum illumination corresponding to a maximum optical density step fifteen to a maximum illumination level $E_m$ (Maximum Exposure) corresponding to a minimum optical density level. Curve No. IV is the result of the modifications brought to Curve No. III to provide a predictably accurate reproduction of a desired optical density range and forms the basis for generating the look-up table. Curve No. IV must be generated; otherwise, due to non-linearities in the toner transfer function Curve No. II and in the imaging element transfer function Curve No. I, the reproduced toned range in the final image will be unacceptable.

As an example, assume for instance, that a desired final optical density is a step 7. Following the solid lines in FIG. 3, it is seen from Curve No. III that a level E1 exposure should be given. That level E1 of exposure results in a charge density D1 on the film sheet surface 26I. As a result of this charge density D1 enough toner will adhere to produce a density step equivalent to 11.6 rather than the desired step 7. The exposure level should, therefore, be changed to give the needed step 7. To reproduce a step 7, based on the toner transfer function Curve No. II, the film sheet must have a charge density D2 as shown by following the dotted lines. This in turn will be obtained by exposing the flim sheet to an exposure level E2, substantially different from the originally predicted E1. This difference between the two exposures is generated and used by this invention to obtain correct exposures, in the following manner.

Figure 4:
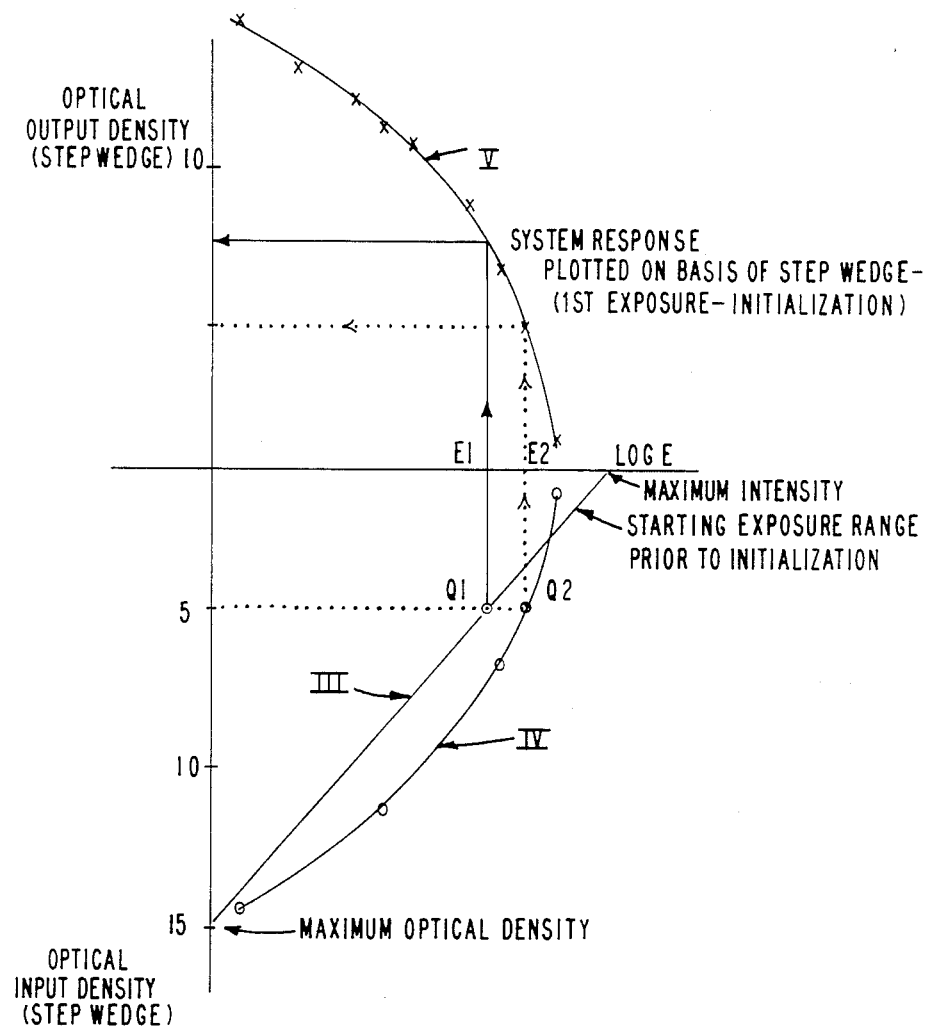
FIG. 4 is a graphic representation of the relationship between the input and output optical densities and the exposure intensity for a system in accordance with the present invention.

Referring to FIG. 4, the combined effects of Curves No. I and II from FIG. 3 are shown as a combined actual transfer function of the full system, Curve No. V. Practically, this curve is not known, so Curve No. IV, which constitutes the look-up table, cannot be precalculated. During the initialization process of the system a response such as Curve No. III is assumed and a film sheet is exposed to a test target, such as the fifteen optical density level step wedge, to produce a test target image of a predetermined number of known optical density levels. Following development of the test target the optical density levels produced are measured and compared to the known input levels. For instance, it is seen by following the solid lines that a density step 5 is reproduced based on Curve No. III as a step 7 since the exposure given is E1. However, from the measured values on the test target it is known that an exposure E2 produces a step 5 by following the dotted lines. Therefore, Point Q1 on Curve No. III should be corrected by displacing to a position Q2 such that $Q2-Q1=E2-E1$. The correction values for all density steps are calculated whenever a value falls between two step wedge values an interpolation to accurately calculate the value needed to reproduce the desired optical density. These values are used to derive Curve No. IV and to generate a look-up table corresponding to Curve No. IV in the look-up table generator 66.

The look-up table is dynamically corrected. Each time an image is produced on an film sheet a test target is also produced in a non-image area of the imaging element. The apparent optical density of the test target is measured by the measurement device 54, converted to a digital quantity by the converter 74, compared to the known optical density values, and the results used to modify the look-up table accordingly to correct for any discrepancies as may have arisen. Such discrepancies may be due, for example, to changes in the film sheet response, to toner changes or to light source intensity level variations, or to atmospheric conditions which may effect the rate of discharge through the photoconductor or other changes. In cases where the required maximum optical density falls outside the range of the look-up table the scorotron film sheet changing characteristics may be adjusted accordingly to produce the needed result. Typically, the toning station includes a bias electrode having a given voltage which controls the amount of toner adhered to the image surface 26I. In cases where the desired minimum density falls outside the look-up table range the bias electrode voltage may be adjusted to bring the minimum density within the look-up table range and the initialization repeated. It is also possible to alter the system response in any desired manner by altering the look-up table in a manner not to reproduce a linearly changing test target, but in a manner which emphasizes certain steps more than others according to preselected criteria.

Those skilled in the art having the benefit of the teachings of the present invention as hereinabove set forth may effect numerous modifications thereto. These modifications are, however, to be construed as lying within the scope of the present invention as defined by the appended claims.

What is claimed is:

1. A method for generating a dynamically corrected look-up table for modulating the intensity of actinic radiation incident on an imaging element comprising the steps of:
   (a) modulating the intensity of actinic radiation representative of an image having a predetermined number of variable optical density levels in accordance with a dynamically corrected look-up table;
   (b) exposing an imaging element to the modulated actinic radiation representative of the image;
   (c) modulating the intensity of the actinic radiation with information representative of a step wedge having a predetermined number of known optical density levels using the dynamically corrected look-up table;
   (d) exposing the imaging element to the actinic radiation modulated by the step wedge information;
   (e) developing the image and step wedge on the imaging element;
   (f) comparing the optical density levels of the developed step wedge to the known optical density levels;
   (g) generating a correction signal based on the difference between the developed step wedge optical density and the known optical density levels, and
   (h) correcting the look-up table in accordance with the correction signal.

2. The method of claim 1 wherein steps (a) and (c) are performed simultaneously.

3. An exposure control system comprising:
   means for storing a look-up table of exposure correction factors;
   means for measuring at the actual optical density of an image of a step wedge and generating a signal representative thereof;
   means for comparing the signal representative of the step wedge with a known set of optical density levels corresponding to the step wedge to generate a set of correction values; and
   means to apply the set of correction values to modify the look-up table of exposure correction factors thereby to form a dynamically corrected look-up table of such exposure correction factors useful to control the intensity of actinic radiation incident on an imaging element.

4. An apparatus for producing a continuous tone toned electrophotographic image comprising:
   (a) means for transporting an imaging element along a predetermined path including first and second spaced positions;
   (b) a dispenser of imaging elements placed adjacent the transporting means surface to dispense one imaging element at a time from the dispenser onto the transporting means, the imaging element having an imaging surface thereon;
   (c) charging means located adjacent to the transporting means following the dispenser in the direction of motion of the transporting means for establishing a uniform electrical charge on the surface of the imaging element;
   (d) means for producing a latent electrostatic image on the imaging surface;
   (e) toning means to apply an electrostatic toner on the latent electrostatic image on the imaging surface to render the latent image visible; and
   (f) means to permanently fix the toned image;
   (g) wherein the means for producing the latent electrostatic image itself comprises:
   means for storing a look-up table of exposure correction factors;

means for measuring at the actual optical density of an image of a step wedge and generating a signal representative thereof;

means for comparing the signal representative of the step wedge with a known set of optical density levels corresponding to the step wedge to generate a set of correction values;

means to apply the set of correction values to modify the look-up table of exposure correction factors thereby to form a dynamically corrected look-up table of such exposure correction factors useful to control the intensity of actinic radiation incident on an imaging element.

* * * * *